(No Model.)

S. E. FOSTER.
VEHICLE REACH COUPLING

No. 273,056.  Patented Feb. 27, 1883.

Attest
S. Walter Fowler
H. B. Applewhaite

Inventor;
Stephen E. Foster
per attys.
A. H. Evans & Co.

UNITED STATES PATENT OFFICE.

STEPHEN E. FOSTER, OF MINNEAPOLIS, MINNESOTA.

VEHICLE-REACH COUPLING.

SPECIFICATION forming part of Letters Patent No. 273,056, dated February 27, 1883.

Application filed December 23, 1882. (No model.)

*To all whom it may concern:*

Be it known that I, STEPHEN E. FOSTER, of Minneapolis, in the county of Hennepin and State of Minnesota, have invented a new and useful Improvement in Reach-Couplings for Vehicles, of which the following is a clear, full, and exact description, reference being had to the accompanying drawings, making a part of this specification, in which—

Figure 1:
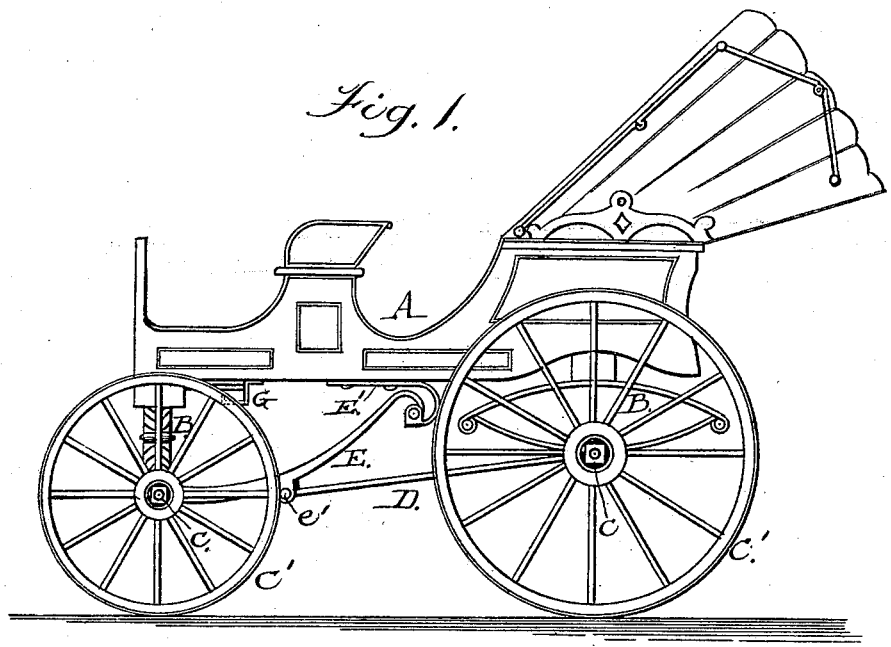
Figure 2:
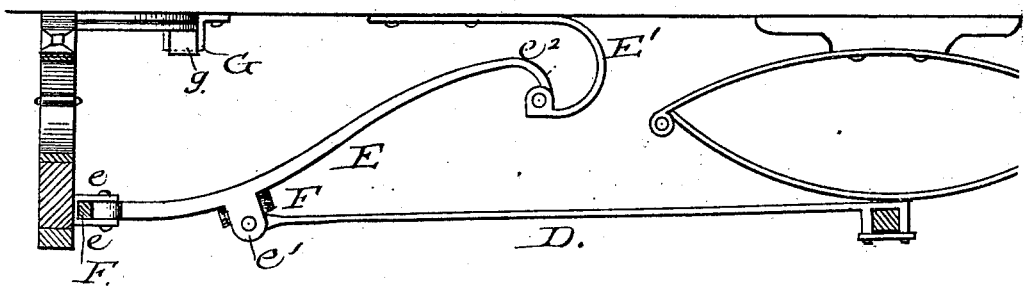

Figure 1 is a side elevation of a vehicle with my improvements attached. Fig. 2 is a detail view to be referred to.

My invention relates to reach-couplings for vehicles; and it consists of certain details of construction, as hereinafter fully described, and specifically pointed out in the claims.

To enable others skilled in the art to make and use my invention, I will proceed to describe the manner in which I have carried it out.

In the drawings, A represents a vehicle; B B, the elliptic springs, which are secured to the axles C C in the usual manner.

C' C' are the wheels.

D is the reach, which is welded onto or otherwise secured to the axle.

E is the coupling-reach, having one end pivoted loosely in the lugs $e\, e$, secured to the front axle. The other end is pivoted loosely in the eye of the curved spring E', fastened on the bottom of the vehicle. One end of the coupling-reach E is flattened and curved to form a spring, $e^2$, to correspond in curve with the curved spring E', as shown in Fig. 1. $e'\, e'$ are lugs on the coupling-reach E to receive the end of the reach D.

G is a loop secured to the under side of the vehicle, and $g$ is a flange-plate fitting loosely in the loop G. Between the inner face of the loop and the flange is the rubber packing or pad by which the fifth-wheel is made noiseless.

The object of my invention is to secure an equalizing-spring below the center of the vehicle, between the elliptic springs on the front and rear axle, and to avoid the rattling noise incident to vehicles the rubber packing or pad F may be introduced, with a decided advantage, at the various joints or couplings.

Having thus described my invention, what I claim as new, and desire to secure by Letters Patent, is—

1. The elliptic springs B and reach D, in combination with the coupling-reach E, provided with the spring portion $e^2$ and curved spring E', substantially as and for the purpose set forth.

2. The elliptic spring B and reach D, in combination with the coupling-reach E, provided with the spring portion $e^2$, curved spring E', and fifth-wheel H, provided with the loop G, and flange-plate or washer $g$, all constructed to operate substantially as and for the purpose set forth.

STEPHEN E. FOSTER.

Witnesses:
 E. W. ROSSMAN,
 FRANK A. SWANSON.